United States Patent
Kishi et al.

(10) Patent No.: US 10,620,368 B2
(45) Date of Patent: Apr. 14, 2020

(54) OPTICAL FIBER AND LASER DEVICE

(71) Applicant: FUJIKURA LTD., Tokyo (JP)

(72) Inventors: Tatsuya Kishi, Chiba (JP); Rintaro Kitahara, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/314,847

(22) PCT Filed: May 12, 2017

(86) PCT No.: PCT/JP2017/018046
§ 371 (c)(1),
(2) Date: Jan. 2, 2019

(87) PCT Pub. No.: WO2018/008251
PCT Pub. Date: Jan. 11, 2018

(65) Prior Publication Data
US 2019/0310416 A1 Oct. 10, 2019

(30) Foreign Application Priority Data
Jul. 4, 2016 (JP) .................................. 2016-132498

(51) Int. Cl.
*G02B 6/02* (2006.01)
*G02B 6/036* (2006.01)
(Continued)

(52) U.S. Cl.
CPC .............. *G02B 6/036* (2013.01); *H01S 3/067* (2013.01); *H01S 3/06708* (2013.01);
(Continued)

(58) Field of Classification Search
CPC . G02B 6/036; H01S 3/1618; H01S 3/094042; H01S 3/0804; H01S 3/094007; H01S 3/06754; H01S 3/06733; H01S 3/094053; H01S 3/09415; H01S 3/0675; H01S 2301/03
See application file for complete search history.

(56) References Cited

U.S. PATENT DOCUMENTS 4,974,931 A * 12/1990 Poole ................. G02B 6/02071
385/28
6,535,678 B1 * 3/2003 Yamauchi .......... G02B 6/02019
385/123
(Continued)

FOREIGN PATENT DOCUMENTS

| EP | 3005496 A1 | 4/2016 |
| EP | 3306759 A1 | 4/2018 |

(Continued)

OTHER PUBLICATIONS

Notice of Allowance issued in corresponding Japanese Patent Application No. 2016-132498 dated Oct. 24, 2017 (3 pages).

*Primary Examiner* — Ellen E Kim
(74) *Attorney, Agent, or Firm* — Osha Liang LLP

(57) ABSTRACT

An optical fiber, used in a laser device, propagates light having a wavelength of 1060 nm through a core in at least an LP01 mode and an LP11 mode. A difference between a propagation constant of light in the LP01 mode and a propagation constant of light in the LP11 mode is 1850 rad/m or more and 4000 rad/m or less.

7 Claims, 5 Drawing Sheets

(51) Int. Cl.
*H01S 3/067* (2006.01)
*H01S 3/08* (2006.01)
*H01S 3/094* (2006.01)
*H01S 3/16* (2006.01)
*H01S 3/23* (2006.01)
*H01S 3/0941* (2006.01)

(52) U.S. Cl.
CPC ...... *H01S 3/06733* (2013.01); *H01S 3/06754* (2013.01); *H01S 3/0804* (2013.01); *H01S 3/094007* (2013.01); *H01S 3/094042* (2013.01); *H01S 3/1618* (2013.01); *H01S 3/2308* (2013.01); *G02B 6/02023* (2013.01); *G02B 6/03633* (2013.01); *H01S 3/0675* (2013.01); *H01S 3/09408* (2013.01); *H01S 3/09415* (2013.01); *H01S 3/094053* (2013.01); *H01S 2301/03* (2013.01)

(56) References Cited

U.S. PATENT DOCUMENTS

| | | | |
|---|---|---|---|
| 7,668,428 B2 * | 2/2010 | Miyabe | G02B 6/02214 385/125 |
| 9,093,815 B2 | 7/2015 | Herstrom et al. | |
| 2001/0017962 A1 * | 8/2001 | Kim | G02B 6/2835 385/43 |
| 2009/0123120 A1 * | 5/2009 | Dragic | G02B 6/03644 385/123 |
| 2010/0195194 A1 | 8/2010 | Chen et al. | |
| 2011/0091178 A1 | 4/2011 | Gapontsev et al. | |
| 2012/0105947 A1 | 5/2012 | Kashiwagi et al. | |
| 2012/0134636 A1 * | 5/2012 | Tsuchida | G02B 6/02228 385/123 |
| 2015/0260910 A1 * | 9/2015 | Taunay | G02B 6/03644 385/127 |
| 2016/0043525 A1 | 2/2016 | Ichige et al. | |
| 2017/0162998 A1 | 6/2017 | Kashiwagi | |

FOREIGN PATENT DOCUMENTS

| | | |
|---|---|---|
| EP | 3462553 A1 | 4/2019 |
| JP | 2003-008114 A | 1/2003 |
| JP | 4667535 B1 | 4/2011 |
| JP | 2016-051859 A | 4/2016 |
| JP | 6268232 B2 | 1/2018 |
| WO | 2014197509 A1 | 12/2014 |
| WO | 2018008251 A1 | 1/2018 |

* cited by examiner

OPTICAL FIBER AND LASER DEVICE

TECHNICAL FIELD

The present invention relates to an optical fiber capable of suppressing deterioration of beam quality while suppressing stimulated Raman scattering, and a laser device.

BACKGROUND

A fiber laser device is used in various fields such as a laser processing field and a medical field because the fiber laser device has excellent light-condensing performance and high power density, and makes it possible to obtain light with a small beam spot. In such a fiber laser device, an output of emitted light is increased. However, as the power density of light in an optical fiber increases, wavelength conversion of light due to stimulated Raman scattering is likely to occur, and light having an unintended wavelength may be emitted. In this case, light reflected by a workpiece or the like returns to the fiber laser device and is amplified again, amplification of light having a wavelength to be amplified in design is thereby unstable, and an output may be unstable.

In order to suppress stimulated Raman scattering in an optical fiber, the effective cross-sectional area of light propagated through a core is increased. Examples of a method for increasing the effective cross-sectional area include a method of increasing the diameter of the core and a method of reducing a relative refractive index difference of the core with respect to a cladding. When the diameter of the core is increased, a light confinement force of the core is increased, and therefore the optical fiber tends to be a multimode fiber. Therefore, in order to suppress the light confinement force of the core, the relative refractive index difference of the core with respect to the cladding is reduced. However, when the relative refractive index difference of the core with respect to the cladding is reduced, the light propagated through the core is easily affected by macrobending or microbending. For this reason, it is required to adjust the relative refractive index difference of the core with respect to the cladding while appropriately increasing the diameter of the core.

However, even in a case where the core is designed as described above, the size of the effective cross-sectional area of light has a limit when it is tried to propagate light in a single mode. Therefore, it is tried to increase the effective cross-sectional area of light by constituting a fiber laser device using an optical fiber having a core capable of propagating light in a few mode like an optical fiber described in the following Patent Literature 1.

[Patent Literature 1] JP 2016-51859 A

A fiber laser device may have excellent beam quality of emitted light from a viewpoint of light-condensing performance or the like. Therefore, even in a case where the effective cross-sectional area of light is increased by using an optical fiber having a core capable of propagating light in a few mode as described above, it is demanded to suppress excitation and oscillation of light in a mode other than a fundamental mode. Note that the beam quality is indicated by, for example, $M^2$ (M square).

SUMMARY

Therefore, embodiments of the present invention provide an optical fiber capable of suppressing deterioration of beam quality while suppressing stimulated Raman scattering, and a laser device.

Embodiments of the present invention provide an optical fiber used in a laser device and capable of propagating light having a wavelength of 1060 nm through a core in at least an LP01 mode and an LP11 mode, and is characterized in that a difference between a propagation constant of light in the LP01 mode and a propagation constant of light in the LP11 mode is 1850 rad/m or more and 4000 rad/m or less.

By propagating light through a core in at least the LP01 mode and the LP11 mode and setting a difference between a propagation constant of light in the LP01 mode and a propagation constant of light in the LP11 mode to 4000 rad/m or less, the effective cross-sectional area of light can be larger than that of a single mode fiber. Therefore, stimulated Raman scattering can be suppressed. Furthermore, the present inventors have found that deterioration of beam quality is suppressed in a case where the difference in a propagation constant of light propagated through the optical fiber between the LP01 mode and the LP11 mode is 1850 rad/m or more. It is considered that this is because light in the LP01 mode light is changed to light in the LP11 mode in a case where there is such a difference. Therefore, the optical fiber according to one or more embodiments of the present invention can suppress deterioration of beam quality while suppressing stimulated Raman scattering.

Furthermore, in one or more embodiments, the difference between the propagation constant of light in the LP01 mode and the propagation constant of light in the LP11 mode is 2500 rad/m or less.

With such a configuration, it is possible to further increase the effective cross-sectional area of light, and to further suppress stimulated Raman scattering.

Furthermore, a refractive index profile of the core with respect to a cladding may be stepwise, the diameter of the core may be 18 μm or more and 28.5 μm or less, and a relative refractive index difference of the core with respect to the cladding may be 0.1% or more and 0.2% or less.

In one or more embodiments, the diameter of the core is 23 μm or more from a viewpoint of further increasing the effective cross-sectional area of light.

Furthermore, ytterbium may be added to the core.

In this case, the above optical fiber can be used as an amplification optical fiber used in a fiber laser device.

Furthermore, the laser device according to one or more embodiments of the present invention includes an optical fiber for propagating light having a wavelength of 1060 nm through a core in at least an LP01 mode and an LP11 mode, and is characterized in that a difference between a propagation constant of light in the LP01 mode and a propagation constant of light in the LP11 mode in the optical fiber is 1850 rad/m or more and 4000 rad/m or less.

Such a laser device can suppress deterioration of beam quality while suppressing stimulated Raman scattering in the optical fiber, and therefore can emit light suppressing a wavelength shift and the deterioration of the beam quality.

Furthermore, ytterbium may be added to the core, and pumping light may be incident on the optical fiber.

In this case, the laser device may be a fiber laser device.

As described above, embodiments of the present invention provide an optical fiber capable of suppressing deterioration of beam quality while suppressing stimulated Raman scattering, and a laser device.

DETAILED DESCRIPTION

Embodiments of an optical fiber and a laser device according to the present invention will be described in detail below with reference to the drawings. The embodiments illustrated below are for facilitating understanding of the present invention and are not intended to limit the present invention. The present invention can be modified and improved without departing from the gist of the present invention. Note that the scale of each of the drawings may be different from the scale described in the following description for facilitating understanding.

Figure 1:
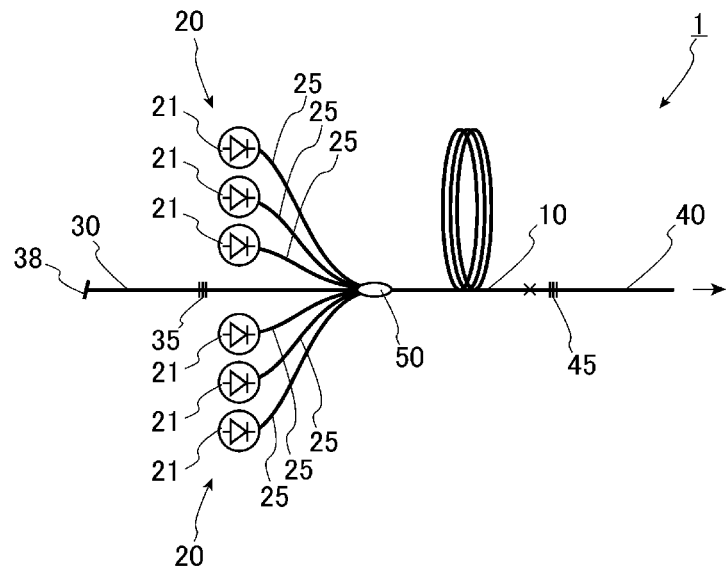
FIG. 1 is a diagram illustrating a laser device according to one or more embodiments of the present invention.

FIG. 1 is a diagram illustrating a laser device according to one or more embodiments. As illustrated in FIG. 1, a laser device 1 of one or more embodiments is a resonator type fiber laser device, and includes an amplification optical fiber 10, a pumping light source 20, a first optical fiber 30, a first FBG 35 disposed in the first optical fiber 30, a second optical fiber 40, a second FBG 45 disposed in the second optical fiber 40, and an optical combiner 50 as main components.

Figure 2:
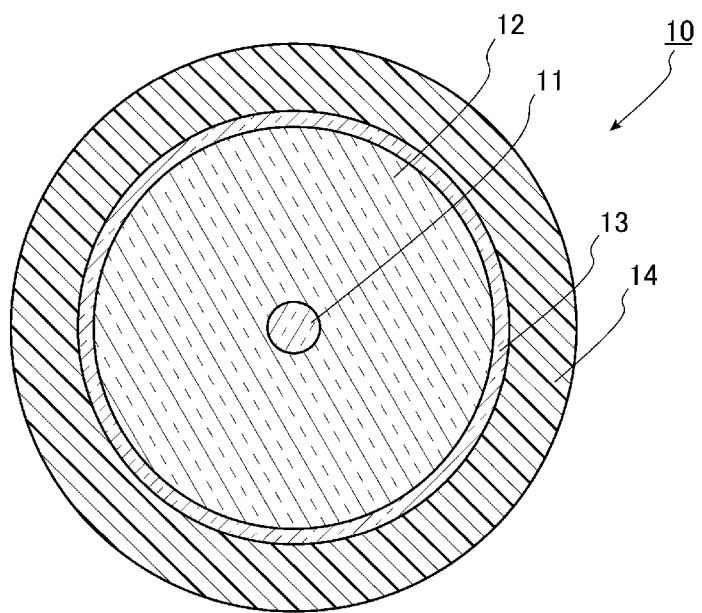
FIG. 2 is a view illustrating a cross section of an amplification optical fiber perpendicular to a longitudinal direction thereof, in accordance with one or more embodiments of the present invention.

FIG. 2 is a cross-sectional view illustrating a cross-sectional structure of the amplification optical fiber 10 illustrated in FIG. 1. As illustrated in FIG. 2, the amplification optical fiber 10 includes a core 11, an inner cladding 12 surrounding an outer circumferential surface of the core 11 without a gap, an outer cladding 13 covering an outer circumferential surface of the inner cladding 12, and a covering layer 14 covering the outer cladding 13 as main constituents, and has a so-called double cladding structure. The refractive index of the inner cladding 12 is lower than the refractive index of the core 11, and the refractive index of the outer cladding 13 is lower than the refractive index of the inner cladding 12.

The core 11 is made of, for example, a quartz to which a dopant for increasing a refractive index, such as germanium (Ge), is added or a quartz to which a dopant for increasing a refractive index is not added. Furthermore, ytterbium (Yb) to be pumped by pumping light emitted from the pumping light source 20 is added to the core 11 as a dopant for amplifying light as described later. In a case where a dopant for increasing a refractive index is added to the core 11, the inner cladding 12 is made of, for example, a quartz to which no dopant is added or a quartz to which a dopant for decreasing a refractive index, such as fluorine (F), is added. Furthermore, in a case where the core 11 is made of a quartz to which a dopant for increasing a refractive index is not added, the inner cladding 12 is made of a quartz to which a dopant for decreasing a refractive index, such as fluorine (F), is added. Furthermore, the outer cladding 13 is made of a resin or a quartz. Examples of the resin include an ultraviolet curing resin. Examples of the quartz include a quartz to which a dopant for decreasing a refractive index, such as fluorine (F), is added so as to further decrease the refractive index than that of the inner cladding 12. Furthermore, examples of a material constituting the covering layer 14 include an ultraviolet curing resin. In a case where the outer cladding 13 is made of a resin, the covering layer 14 is made of an ultraviolet curing resin different from the resin constituting the outer cladding.

Furthermore, the amplification optical fiber 10 is a few mode fiber. In a case where light having a wavelength of 1060 nm is propagated through the core 11, as the light, in addition to light in an LP01 mode which is a fundamental mode, light in a higher order mode equal to or higher than a secondary LP mode is propagated. Examples of the light in a higher order mode include light in an LP11 mode, light in an LP21 mode, and light in an LP02 mode.

The pumping light source 20 includes a plurality of laser diodes 21. In the one or more embodiments, each of the laser diodes 21 is, for example, a Fabry-Perot type semiconductor laser made of a GaAs-based semiconductor and emits pumping light having a center wavelength of 915 nm. Furthermore, each of the laser diodes 21 of the pumping light source 20 is connected to an optical fiber 25, and pumping light emitted from each of the laser diodes 21 is propagated through the optical fiber 25 as multimode light, for example.

Each optical fiber 25 is connected to one end of the amplification optical fiber 10 in the optical combiner 50. Specifically, a core of each optical fiber 25 is connected to the inner cladding 12 of the amplification optical fiber 10 such that the core of each optical fiber 25 is optically coupled with the inner cladding 12 of the amplification optical fiber 10. Therefore, the pumping light emitted from each of the laser diodes 21 is incident on the inner cladding 12 of the amplification optical fiber 10 via the optical fiber 25, and is mainly propagated through the inner cladding 12.

Figure 3:
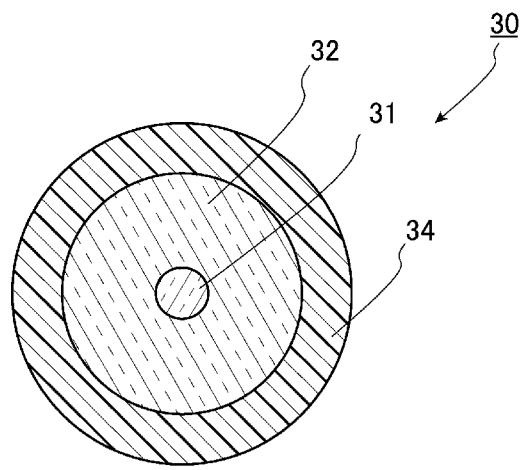
FIG. 3 is a view illustrating a cross section of a first optical fiber perpendicular to a longitudinal direction thereof, in accordance with one or more embodiments of the present invention.

FIG. 3 is a view illustrating the first optical fiber 30. The first optical fiber 30 includes a core 31, a cladding 32 surrounding an outer circumferential surface of the core 31 without a gap, and a covering layer 34 covering the cladding 32 as main constituents. The configuration of the core 31 is similar to the configuration of the core 11 of the amplification optical fiber 10, for example, except that the core 31 does not contain a rare earth element such as ytterbium. For example, the diameter of the core 31 is the same as the diameter of the core 11. Furthermore, the cladding 32 has a similar configuration to the inner cladding 12, for example, except that the diameter of the cladding 32 is smaller than the diameter of the inner cladding 12 of the amplification optical fiber 10. The covering layer 34 has a similar configuration to, for example, the covering layer 14 of the amplification optical fiber 10.

The first optical fiber 30 is connected to one end of the amplification optical fiber 10 together with the optical fiber 25 in the optical combiner 50. Specifically, the core 11 of the amplification optical fiber 10 is connected to the core 31 of the first optical fiber 30 such that the core 31 of the first optical fiber 30 is optically coupled with the core 11 of the amplification optical fiber 10. The first optical fiber 30 is a few mode fiber and propagates similar light to light propagated through the core 11 of the amplification optical fiber 10. Therefore, light in each LP mode propagated through the core 11 of the amplification optical fiber 10 can be propagated through the core 31 of the first optical fiber 30 as it is.

Furthermore, the core 31 of the first optical fiber contains a photosensitive element (which changes a refractive index by irradiation with light) such as germanium. In the core 31 of the first optical fiber 30, the first FBG 35 is disposed. In this way, the first FBG 35 is disposed on one side of the amplification optical fiber 10 and is optically coupled with the core 11 of the amplification optical fiber 10. In the first FBG 35, a high refractive index portion having a refractive index higher than that in a portion of the core 31 other than the first FBG 35 and a low refractive index portion having a similar refractive index to that in the portion of the core 31 other than the first FBG 35 are periodically repeated in a longitudinal direction of the core 31. This repeating pattern of the high refractive index portion is formed, for example, by irradiating a portion to be the high refractive index portion with an ultraviolet ray. The first FBG 35 thus formed is configured so as to reflect at least light including a wavelength of 1060 nm out of light emitted from pumped ytterbium added to the core 11 of the amplification optical fiber 10. Furthermore, the reflectance of the first FBG 35 is higher than the reflectance of the second FBG 45 described later, and the first FBG 35 reflects light having a wavelength of 1060 nm out of the light emitted from ytterbium at 99% or more.

Note that a terminal portion 38 for converting light into heat is disposed on the opposite side of the first optical fiber 30 to a side where the amplification optical fiber 10 is connected.

The second optical fiber 40 has a similar configuration to the first optical fiber 30 except that the diameter of the cladding is the same as the diameter of the inner cladding 12 of the amplification optical fiber 10. Therefore, the second optical fiber 40 is a few mode fiber like the first optical fiber 30, and can propagate similar light to light propagated by the core 11 of the amplification optical fiber 10. The second optical fiber is connected at the other end of the amplification optical fiber 10 such that the core 11 of the amplification optical fiber 10 is optically coupled with the core of the second optical fiber 40. Therefore, the few mode light propagated through the core 11 of the amplification optical fiber 10 is propagated through the core of the second optical fiber 40 while being in the few mode.

Furthermore, the second FBG 45 is disposed in the core of the second optical fiber 40. In this way, the second FBG 45 is disposed on the other side of the amplification optical fiber 10 and is optically coupled with the core 11 of the amplification optical fiber 10. Like the first FBG 35, the second FBG 45 is formed by periodically repeating a high refractive index portion and a low refractive index portion. The second FBG 45 is configured so as to reflect light including a wavelength of 1060 nm and reflected by the first FBG 35 with a reflectance lower than that of the first FBG 35. In a case where light reflected by the first FBG 35 is incident on the second FBG 45, the second FBG 45 reflects the light with a reflectance of, for example, about 10%. In this way, a resonator is formed by the first FBG 35, the amplification optical fiber 10, and the second FBG 45. Furthermore, in one or more embodiments, nothing is particularly connected to the other end of the second optical fiber 40 on the opposite side to the amplification optical fiber, but a glass rod or the like may be connected thereto.

Next, operation of the laser device 1 will be described.

First, pumping light is emitted from each of the laser diodes 21 of the pumping light source 20. The pumping light is incident on the inner cladding 12 of the amplification optical fiber 10 via the optical fiber 25, and is propagated mainly through the inner cladding 12. The pumping light propagated through the inner cladding 12 pumps ytterbium added to the core 11 when passing through the core 11. The pumped ytterbium emits spontaneous emission light in a specific wavelength band. With the spontaneous emission light as a starting point, light including a wavelength of 1060 nm and reflected in common by the first FBG 35 and the second FBG 45 causes resonance between the first FBG 35 and the second FBG 45. When the resonating light is propagated through the core 11 of the amplification optical fiber 10, the pumped ytterbium causes stimulated emission, and the resonating light is amplified. A part of the resonating light passes through the second FBG 45 and is emitted from the second optical fiber 40. Then, when gain and loss become equal to each other in a resonator including the first FBG 35, the amplification optical fiber 10, and the second FBG 45, a laser oscillation state is brought about, and light of a constant power is emitted from the second optical fiber 40.

By the way, as described above, each of the amplification optical fiber 10, the first optical fiber 30, and the second optical fiber 40 is a few mode fiber. Therefore, the light causing resonance between the first FBG 35 and the second FBG 45 and the light passing through the second FBG 45 include light in several higher order modes equal to or higher than a secondary LP mode in addition to light in a fundamental mode. In addition to the light in a fundamental mode, the light in several higher order modes equal to or higher than a secondary LP mode is propagated through the second optical fiber 40 and is emitted from the laser device 1.

Note that most of light passing through the first FBG 35 from the side of the amplification optical fiber 10 is converted into heat by the terminal portion 38 and disappears.

Here, the propagation constant of light propagated through the core of the optical fiber will be described. Incidentally, in the following description, cladding means the cladding 32 of the first optical fiber 30, the cladding of the second optical fiber 40, and the inner cladding 12 of the amplification optical fiber 10. The propagation constant is a constant related to phase fluctuation in a case where a light wave is propagated. Light is a wave. Therefore, if the amplitude of light is represented by A and a distance from the center of the core is represented by z, an electric field E at the core is indicated by the following formula (1).

$$E = A \exp[-(\alpha + i\beta)z] \tag{1}$$

Note that $\alpha$ represents an extinction coefficient indicating attenuation of a wave, $\beta$ represents a propagation constant indicating propagation of a wave, and i represents an imaginary unit. The above formula (1) can be described for light in each mode propagated through the core. Light in the LP01 mode and light in the LP11 mode have extinction coefficients α different from each other and propagation constants β different from each other. The propagation constant β indicates propagation of a wave. Therefore, defining the propagation constant β of light propagated through the core defines an effective refractive index $n_{eff}$ of the light propagated through the core. If the wavelength of light propagated through the core is represented by λ, the effective refractive index $n_{eff}$ can be indicated by the following formula (2).

$$n_{eff} = \lambda \beta / 2\pi \quad (2)$$

By the way, an effective cross-sectional area $A_{eff}$ of light propagated through the core is a value correlating with the effective refractive index $n_{eff}$ of the light. Therefore, it can be said that the effective cross-sectional area $A_{eff}$ is a value correlating with the propagation constant β of the light.

Next, if a difference in a propagation constant of light propagated through the core between the LP01 mode and the LP11 mode is represented by Δβ, the propagation constant difference Δβ also correlates with the effective cross-sectional area $A_{eff}$.

Figure 4:
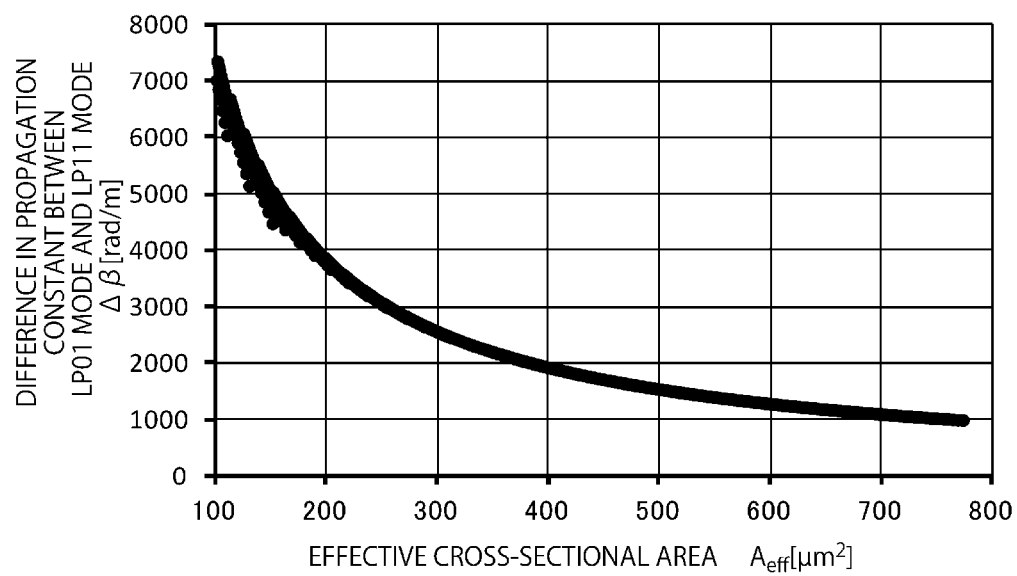
FIG. 4 is a simulation graph illustrating a relationship between the effective cross-sectional area of light propagated through an optical fiber and a difference between a propagation constant of light in the LP01 mode and a propagation constant of light in the LP11 mode, in accordance with one or more embodiments of the present invention.

FIG. 4 is a simulation graph illustrating a relationship between the effective cross-sectional area of light propagated through an optical fiber and a difference between the propagation constant of light in the LP01 mode and the propagation constant of light in the LP11 mode. In the simulation of FIG. 4, the refractive index profile of the core is constant in a radial direction, that is, a stepwise refractive index profile. Furthermore, in the simulation, the diameter of the core is changed from 10 μm to 40 μm at intervals of 1 μm, and the relative refractive index difference of the core with respect to a cladding is changed from 0.1% to 0.2% at intervals of 0.005%. It is found from FIG. 4 that the propagation constant difference Δβ correlates with the effective cross-sectional area $A_{eff}$ as described above. Furthermore, as illustrated in FIG. 4, if the propagation constant difference Δβ between light in the LP01 mode and light in the LP11 mode is 4000 rad/m or less, the effective cross-sectional area of light can be 200 μm² or more. If the effective cross-sectional area of light is 200 μm² or more, the energy density of light can be reduced, and occurrence of stimulated Raman scattering can be suppressed. Furthermore, if the propagation constant difference Δβ is 2500 rad/m or less, the effective cross-sectional area of light can be 300 μm² or more. If the effective cross-sectional area of light is 300 μm² or more, the energy density of light can be further reduced, and occurrence of stimulated Raman scattering can be further suppressed.

Figure 5:
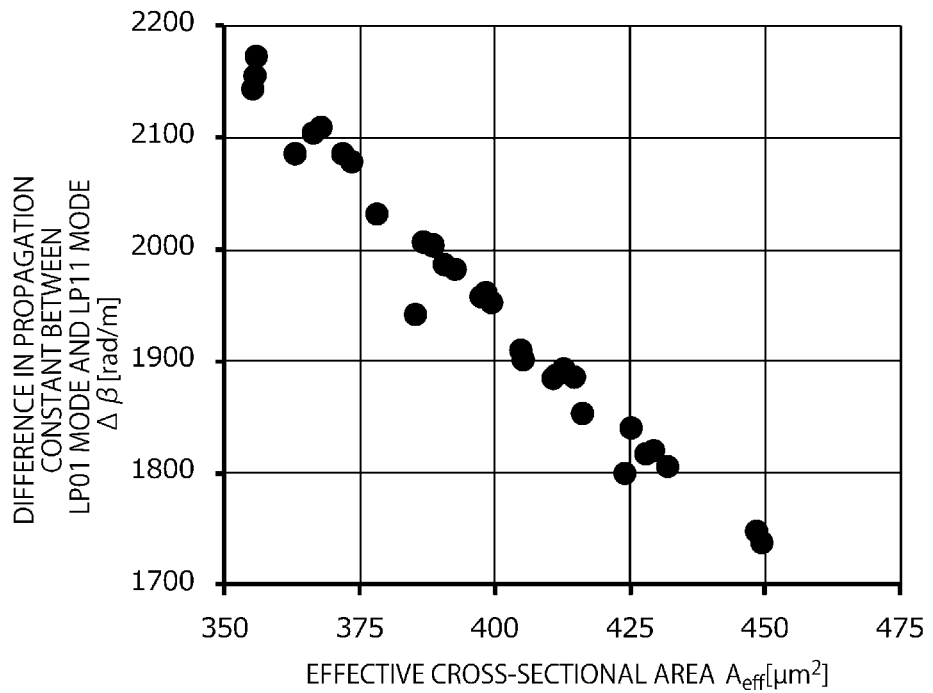
FIG. 5 is a graph of actually measured values illustrating a relationship between the effective cross-sectional area of light propagated through an optical fiber and the difference between the propagation constant of light in the LP01 mode and the propagation constant of light in the LP11 mode, in accordance with one or more embodiments of the present invention.

FIG. 5 is a graph of actually measured values illustrating a relationship between the effective cross-sectional area of light propagated through an optical fiber and the difference between the propagation constant of light in the LP01 mode and the propagation constant of light in the LP11 mode. In the measured optical fiber, the refractive index profile of a core is stepwise, the diameter of the core is 28 μm, the relative refractive index difference of the core with respect to a cladding is 0.12%, and light in the LP01 mode, the LP11 mode, the LP21 mode, the LP02 mode, an LP31 mode, and an LP12 mode can be theoretically propagated. Also in the actually measured values illustrated in FIG. 5, it is found that the propagation constant difference Δβ correlates with the effective cross-sectional area $A_{eff}$ as described above.

Figure 6:
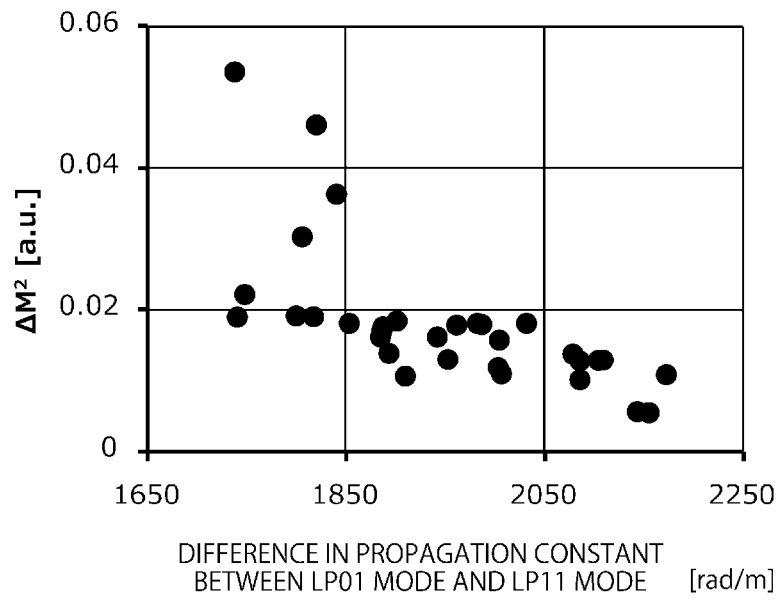
FIG. 6 is a graph of actually measured values illustrating a relationship between the difference between the propagation constant of light in the LP01 mode and the propagation constant of light in the LP11 mode and beam quality ($M^2$), in accordance with one or more embodiments of the present invention.

Next, a relationship between the propagation constant difference Δβ between light in the LP01 mode and light in the LP11 mode and beam quality of light emitted from the optical fiber will be described. FIG. 6 is a diagram illustrating actually measured values of the relationship. The actual measurement in FIG. 6 was performed by using the optical fiber used in FIG. 5, making light in a fundamental mode incident from one end of the optical fiber, and measuring $M^2$ of the light emitted from the other end. In FIG. 6, the vertical axis indicates a difference $\Delta M^2$ between $M^2$ of incident light and $M^2$ of emitted light. $M^2$ of light including only light in a fundamental mode is 1. A value of $M^2$ increases as light in a higher order mode is excited and oscillated and beam quality becomes poor. Therefore, as the difference $\Delta M^2$ in FIG. 6 is larger, the quality of an emitted beam is poorer. As can be seen from FIG. 6, when the propagation constant difference Δβ between light in the LP01 mode and light in the LP11 mode is smaller than 1850 [rad/m], the beam quality may be deteriorated. Therefore, it is found that deterioration of the beam quality of light emitted from the optical fiber can be suppressed if the propagation constant difference Δβ between light in the LP01 mode and light in the LP11 mode is 1850 [rad/m] or more.

Next, a relationship among a diameter r of a core, a relative refractive index difference Δn of the core with respect to a cladding, and the propagation constant difference Δβ between light in the LP01 mode and light in the LP11 mode will be described. If the refractive index of the core is represented by $n_1$ and the refractive index of the cladding is represented by $n_2$, the relative refractive index difference Δn of the core with respect to the cladding is indicated by the following formula (3).

$$\Delta n = (n_1^2 - n_2^2)/(2n_1^2) \quad (3)$$

Figure 7:
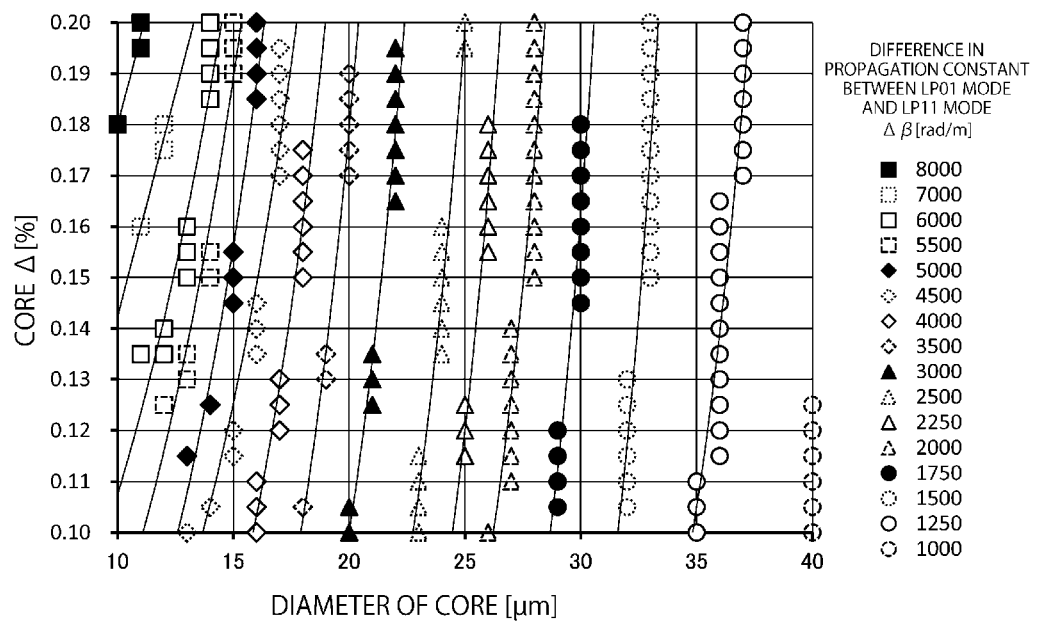
FIG. 7 is a diagram illustrating a relationship between the diameter of a core and a relative refractive index difference of the core with respect to a cladding for each difference between the propagation constant of light in the LP01 mode and the propagation constant of light in the LP11 mode, in accordance with one or more embodiments of the present invention.

FIG. 7 is a diagram illustrating a relationship between the diameter of the core and the relative refractive index difference Δn of the core with respect to the cladding with simulation for each propagation constant difference Δβ between light in the LP01 mode and light in the LP11 mode. Incidentally, also in this drawing, the refractive index profile of the core is constant in a radial direction, that is, stepwise. As illustrated in FIG. 7, it is found that the propagation constant difference Δβ can be 4000 rad/m or less if the diameter of the core is 18 μm or more. In other words, considering FIG. 4, if the diameter of the core is 18 μm or more, the effective cross-sectional area of light can be 200 μm² or more. Furthermore, it is found that the propagation constant difference Δβ can be 2500 rad/m or less if the diameter is 23 μm or more. In other words, considering FIG. 4, if the diameter of the core is 23 μm or more, the effective cross-sectional area of light can be made 300 μm² or more. Furthermore, it is found that the propagation constant difference Δβ can be 1850 rad/m or more if the diameter of the core is 28.5 μm or less. In other words, considering FIG. 6, from the above, if the diameter of the core is 28.5 μm or less, deterioration of beam quality of light emitted from the optical fiber can be suppressed.

Therefore, in the laser device 1 that emits light having a wavelength of 1060 nm, if the propagation constant difference Δβ in light propagated through the amplification optical fiber 10 between the LP01 mode and the LP11 mode is 4000 rad/m or less, occurrence of stimulated Raman scattering can be suppressed, and if the propagation constant difference Δβ is 2500 rad/m or less, occurrence of stimulated Raman scattering can be further suppressed. Furthermore, if the propagation constant difference Δβ in light propagated through the amplification optical fiber 10 between the LP01 mode and the LP11 mode is 1850 rad/m or more, deterioration of the beam quality of light emitted from the laser device 1 can be suppressed. Therefore, the refractive index profile of the core 11 with respect to the inner cladding 12 in the amplification optical fiber 10 is stepwise. In one or more embodiments, the diameter of the core is 18 µm or more and 28.5 µm or less. In one or more embodiments, the diameter of the core is 23 µm or more and 28.5 µm or less.

Similarly, in the laser device 1, if the propagation constant difference Δβ in light propagated through the first optical fiber 30 and the second optical fiber 40 between the LP01 mode and the LP11 mode is 4000 rad/m or less, occurrence of stimulated Raman scattering can be suppressed, and if the propagation constant difference Δβ is 2500 rad/m or less, occurrence of stimulated Raman scattering can be further suppressed. Furthermore, if the propagation constant difference Δβ in light propagated through the first optical fiber 30 and the second optical fiber 40 between the LP01 mode and the LP11 mode is 1850 rad/m or more, deterioration of the beam quality of light emitted from the laser device 1 can be suppressed. Therefore, also in the first optical fiber 30 and the second optical fiber 40, the refractive index profile of the core with respect to the cladding is stepwise in a similar manner to the amplification optical fiber 10. In one or more embodiments, the diameter of the core is 18 µm or more and 28.5 µm or less. In one or more embodiments, the diameter of the core is 23 µm or more and 28.5 µm or less.

As described above, the optical fiber used in the laser device 1 of one or more embodiments can propagate light having a wavelength of 1060 nm through a core in at least the LP01 mode and the LP11 mode, and can suppress deterioration of beam quality while suppressing stimulated Raman scattering by setting a difference between a propagation constant of light in the LP01 mode and a propagation constant of light in the LP11 mode to 1850 rad/m or more and 4000 rad/m or less.

Next, embodiments of the present invention will be described in detail with reference to FIG. 8. Note that constituent elements the same as or equivalent to those in the embodiments described above are denoted by the same reference numerals, and duplicate description may be omitted unless otherwise described.

Figure 8:
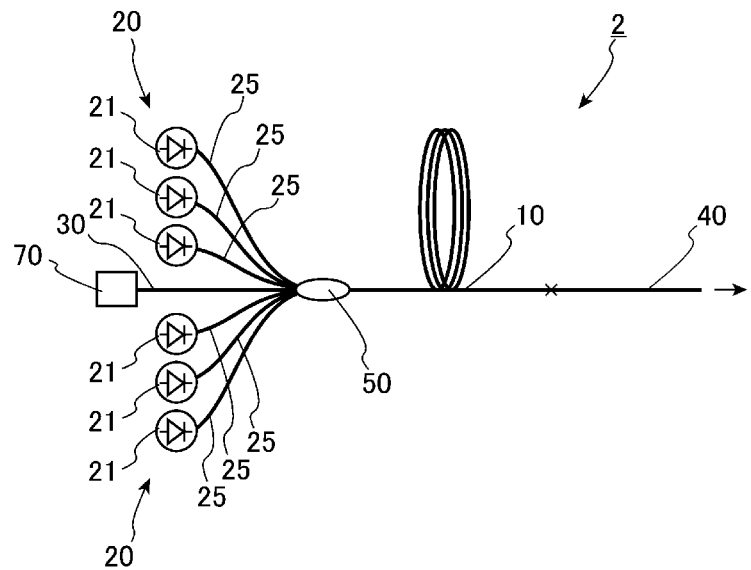
FIG. 8 is a diagram illustrating a laser device according to one or more embodiments of the present invention.

FIG. 8 is a diagram illustrating a laser device according to one or more embodiments. As illustrated in FIG. 8, a laser device 2 of one or more embodiments is different from the laser device 1 of the embodiments described above in that the laser device 2 is a master oscillator power amplifier (MO-PA) type fiber laser device. Therefore, the laser device 2 of the one or more embodiments includes a seed light source 70.

The seed light source 70 is constituted by, for example, a laser diode or a fiber laser, and is configured so as to emit seed light having a wavelength of 1060 nm. The seed light source 70 is connected to a first optical fiber 30 having a similar configuration to the first optical fiber 30 of the embodiments described above and not having FBG formed therein. Seed light emitted from the seed light source 70 is propagated through a core of the first optical fiber 30.

An optical combiner 50 of one or more embodiments has a similar configuration to the optical combiner 50 of the embodiments described above. Therefore, seed light emitted from the seed light source 70 is incident on a core 31 of an amplification optical fiber 10 via the core of the first optical fiber 30 and is propagated through the core 31. Furthermore, similarly to the laser device 1 of the embodiments described above, pumping light emitted from each laser diode 21 of a pumping light source 20 is incident on an inner cladding 12 of the amplification optical fiber 10, is mainly propagated through the inner cladding 12, and pumps ytterbium added to a core 11. Therefore, the seed light propagated through the core is amplified by stimulated emission of pumped ytterbium, and the amplified seed light is emitted as output light from the amplification optical fiber 10. The light emitted from the amplification optical fiber 10 is emitted via a second optical fiber 40 in a similar manner to the embodiments described above.

Also in one or more embodiments, at least one of the amplification optical fiber 10, the first optical fiber 30, and the second optical fiber 40 used in the laser device 2 can propagate light having a wavelength of 1060 nm through a core in at least the LP01 mode and the LP11 mode, and can suppress deterioration of beam quality while suppressing stimulated Raman scattering by setting a difference between a propagation constant of light in the LP01 mode and a propagation constant of light in the LP11 mode to 1850 rad/m or more and 4000 rad/m or less. Incidentally, in one or more embodiments, in a case where the power of seed light propagated through the first optical fiber 30 is small, occurrence of stimulated Raman scattering can be suppressed even if the first optical fiber 30 does not have the above configuration.

Next, embodiments of the present invention will be described in detail with reference to FIG. 9. Note that constituent elements the same as or equivalent to those in the embodiments described above are denoted by the same reference numerals, and duplicate description will be omitted unless otherwise described.

Figure 9:
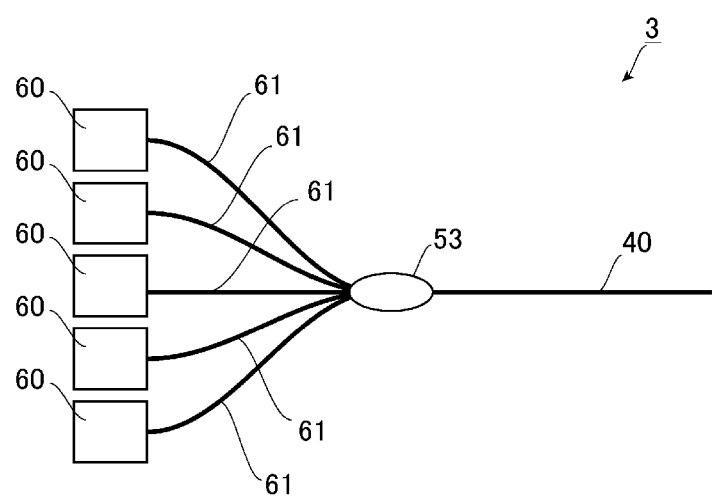
FIG. 9 is a diagram illustrating a laser device according to one or more embodiments of the present invention.

FIG. 9 is a diagram illustrating a laser device according to one or more embodiments. As illustrated in FIG. 9, a laser device 3 of one or more embodiments includes a plurality of light sources 60, an optical combiner 53, and a second optical fiber 40 similar to the second optical fiber in the embodiments described above as main constituents.

Each of the light sources 60 is a laser device that emits light having a wavelength of 1060 nm, and is, for example, a fiber laser device or a solid-state laser device. In a case where each of the light sources 60 is a fiber laser device, each of the light sources 60 is a resonator type fiber laser device similar to that in the embodiments described above, or a MO-PA type fiber laser device similar to that in the embodiments described above.

To each of the light sources 60, an optical fiber 61 for propagating light emitted from each of the light sources 60 is connected. Each optical fiber 61 is, for example, similar to the first optical fiber 30 of the embodiments described above. Therefore, light emitted from each of the light sources 60 is propagated through each optical fiber 61 in a few mode.

The optical combiner 53 optically connects a core of each optical fiber 61 to a core of the second optical fiber 40.

In the laser device 3 of one or more embodiments, light having a wavelength of 1060 nm is emitted from each of the light sources 60, and the light is incident on the core of the second optical fiber 40 via each optical fibers 61 and via the optical combiner 53. Then, the light is emitted from the second optical fiber 40.

Also in one or more embodiments, the second optical fiber 40 used in the laser device 3 can propagate light having a wavelength of 1060 nm through a core in at least the LP01 mode and the LP11 mode, and can suppress deterioration of beam quality while suppressing stimulated Raman scattering by setting a difference between a propagation constant of light in the LP01 mode and a propagation constant of light in the LP11 mode to 1850 rad/m or more and 4000 rad/m or less.

Hitherto, the present invention has been described with reference to the embodiments as examples. However, the present invention is not limited thereto, and the configuration can be appropriately changed without departing from the scope of the present invention. That is, the optical fiber used in the laser device of the present invention only needs to be able to propagate light having a wavelength of 1060 nm through a core in at least the LP01 mode and the LP11 mode, and to set a difference between a propagation constant of light in the LP01 mode and a propagation constant of light in the LP11 mode to 1850 rad/m or more and 4000 rad/m or less. The other components of the configuration can be appropriately changed.

As described above, the present invention provides an optical fiber capable of suppressing deterioration of beam quality while suppressing stimulated Raman scattering, and a laser device. Use thereof in a processing laser device or the like is expected.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 2, 3 . . . laser device
10 . . . amplification optical fiber
20 . . . pumping light source
30 . . . first optical fiber
31 . . . core
35 . . . first FBG
40 . . . second optical fiber
45 . . . second FBG
60 . . . light source
70 . . . seed light source

The invention claimed is:

1. An optical fiber used in a laser device, comprising:
a core, wherein
the optical fiber propagates light having a wavelength of 1060 nm through the core in at least an LP01 mode and an LP11 mode, and
a difference between a propagation constant of light in the LP01 mode and a propagation constant of light in the LP11 mode is 1850 rad/m or more and 4000 rad/m or less.

2. The optical fiber according to claim 1, wherein
the difference between the propagation constant of light in the LP01 mode and the propagation constant of light in the LP11 mode is 2500 rad/m or less.

3. The optical fiber according to claim 1, wherein
a refractive index profile of the core with respect to a cladding is stepwise,
the core has a diameter of 18 μm or more and 28.5 μm or less, and
a relative refractive index difference of the core with respect to the cladding is 0.1% or more and 0.2% or less.

4. The optical fiber according to claim 3, wherein
the core has a diameter of 23 μm or more.

5. The optical fiber according to claim 1, wherein
ytterbium is added to the core.

6. A laser device comprising an optical fiber, comprising:
a core, wherein
the optical fiber propagates light having a wavelength of 1060 nm through the core in at least an LP01 mode and an LP11 mode, and
a difference between a propagation constant of light in the LP01 mode and a propagation constant of light in the LP11 mode is 1850 rad/m or more and 4000 rad/m or less.

7. The laser device according to claim 6, wherein
ytterbium is added to the core, and
pumping light is incident on the optical fiber.

* * * * *